(12) United States Patent
Taudt et al.

(10) Patent No.: US 10,703,254 B2
(45) Date of Patent: *Jul. 7, 2020

(54) LIGHTING DEVICE FOR VEHICLE HEADLIGHT

(71) Applicant: ZKW Group GmbH, Wieselburg (AT)

(72) Inventors: Lukas Taudt, Wieselburg (AT); Stefan Tomasetig, Purgstall an der Erlauf (AT); Heimo Frank, Wieselburg (AT)

(73) Assignee: ZKW GROUP GMBH, Wieselburg (AT)

( * ) Notice: Subject to any disclaimer, the term of this patent is extended or adjusted under 35 U.S.C. 154(b) by 0 days.

This patent is subject to a terminal disclaimer.

(21) Appl. No.: 16/701,965

(22) Filed: Dec. 3, 2019

(65) Prior Publication Data

US 2020/0101888 A1 Apr. 2, 2020

Related U.S. Application Data

(63) Continuation of application No. 15/561,412, filed as application No. PCT/AT2016/050067 on Mar. 18, 2016, now Pat. No. 10,518,695.

(30) Foreign Application Priority Data

Mar. 25, 2015 (AT) .............................. A 50238/2015

(51) Int. Cl.
*B60Q 1/00* (2006.01)
*F21S 41/143* (2018.01)
(Continued)

(52) U.S. Cl.
CPC ............. *B60Q 1/0041* (2013.01); *B60Q 1/14* (2013.01); *F21S 41/125* (2018.01);
(Continued)

(58) Field of Classification Search
CPC .. B60Q 1/0041; B60Q 1/14; B60Q 2300/056; F21S 41/125; F21S 41/141; F21S 41/143; F21S 41/16; F21S 41/32; F21S 41/663
See application file for complete search history.

(56) References Cited

U.S. PATENT DOCUMENTS 2,253,615 A 8/1941 Falge
5,055,981 A 10/1991 Nino
(Continued)

FOREIGN PATENT DOCUMENTS

DE 19854616 A1 5/2000
DE 102008031078 A1 1/2009
(Continued)

OTHER PUBLICATIONS

Austrian Search Report issued in application No. A 50238/2015, completed Jan. 14, 2016 (1 page).
(Continued)

*Primary Examiner* — Tsion Tumebo
(74) *Attorney, Agent, or Firm* — Eversheds Sutherland (US) LLP

(57) ABSTRACT

A lighting device for a vehicle headlight, the lighting device having a first light module (105), a second light module (106) and a third light module (107), wherein, when the modules are installed in a vehicle, the first light module generates a first overall light distribution (A), the second light module generates a first partial light distribution (F), and the third light module generates a second partial light distribution (Z), these distributions being in a region in front of the vehicle. When the first and second light modules are illuminated at the same time, the first overall light distribution at least partially overlaps the first partial light distribution, forming a second overall light distribution (AF). The second partial light distribution lies underneath the hh line and at least partially overlaps the second overall light
(Continued)

distribution (AF). When all three light modules are activated simultaneously, a third overall light distribution (AF') is formed.

30 Claims, 7 Drawing Sheets

(51) Int. Cl.
| | |
|---|---|
| *F21S 41/663* | (2018.01) |
| *F21S 41/16* | (2018.01) |
| *F21S 41/141* | (2018.01) |
| *F21S 41/32* | (2018.01) |
| *F21S 41/125* | (2018.01) |
| *B60Q 1/14* | (2006.01) |

(52) U.S. Cl.
CPC .......... *F21S 41/141* (2018.01); *F21S 41/143* (2018.01); *F21S 41/16* (2018.01); *F21S 41/32* (2018.01); *F21S 41/663* (2018.01); *B60Q 2300/056* (2013.01)

(56) References Cited

U.S. PATENT DOCUMENTS

| | | | |
|---|---|---|---|
| 5,673,990 A | 10/1997 | Neumann | |
| 5,967,651 A | 10/1999 | Neumann | |
| 5,988,837 A | 11/1999 | Eichhorn | |
| 6,062,714 A | 5/2000 | Serizawa | |
| 7,144,143 B2 | 12/2006 | Matsumoto | |
| 7,281,830 B2 | 10/2007 | Ishida | |
| 7,367,703 B2 | 5/2008 | Yagi | |
| 7,500,773 B2 | 3/2009 | Komatsu | |
| 7,607,811 B2 | 10/2009 | Okada | |
| 7,625,109 B2 | 12/2009 | Tsukamoto | |
| 7,744,261 B2 | 6/2010 | Fukawa | |
| 8,231,255 B2 | 7/2012 | Konishi | |
| 8,292,481 B2 | 10/2012 | Gotz et al. | |
| 8,801,242 B2 | 8/2014 | Hamm et al. | |
| 9,140,424 B2 | 9/2015 | Mochizuki | |
| 9,358,918 B2 | 6/2016 | Mochizuki | |
| 9,739,438 B2 | 8/2017 | Uchida | |
| 9,878,655 B2 | 1/2018 | Tanaka | |
| 10,052,999 B2 | 8/2018 | Kanayama | |
| 2002/0085387 A1 | 7/2002 | Taniuchi | |
| 2002/0186565 A1 | 12/2002 | Taniuchi | |
| 2003/0174493 A1 | 9/2003 | Kinouchi | |
| 2005/0231971 A1 | 10/2005 | Ishida | |
| 2005/0237758 A1 | 10/2005 | Takeda | |
| 2006/0120094 A1 | 6/2006 | Tsukamoto | |
| 2007/0070642 A1 | 3/2007 | Futami | |
| 2007/0103923 A1* | 5/2007 | Fukawa | F21S 41/143 362/545 |
| 2008/0253142 A1 | 10/2008 | Nakada | |
| 2009/0231873 A1 | 9/2009 | Kotajima et al. | |
| 2010/0232173 A1 | 9/2010 | Ohno | |
| 2011/0012510 A1 | 1/2011 | Tani | |
| 2012/0294024 A1 | 11/2012 | Peck | |
| 2013/0250599 A1 | 9/2013 | Owada | |
| 2014/0185307 A1* | 7/2014 | Lee | B60Q 1/10 362/465 |
| 2015/0323145 A1* | 11/2015 | Kanayama | F21S 41/255 362/487 |

FOREIGN PATENT DOCUMENTS

| | | |
|---|---|---|
| DE | 102007052742 A1 | 5/2009 |
| DE | 102008036193 A1 | 2/2010 |
| DE | 102009053581 A1 | 3/2011 |
| EP | 2517929 A2 | 10/2012 |
| GB | 2277579 B | 11/1994 |

OTHER PUBLICATIONS

International Search Report for PCT/AT2016/050067, dated Jul. 14, 2016 (3 pages).

* cited by examiner

LIGHTING DEVICE FOR VEHICLE HEADLIGHT

CROSS-REFERENCE TO RELATED APPLICATIONS

This is a continuation of U.S. application Ser. No. 15/561,412, filed Sep. 25, 2017, which is the national stage of PCT/AT2016/050067, filed Mar. 18, 2016, which claims priority to Austria Application No. A 50238/2015, filed Mar. 25, 2015. These applications are incorporated herein by reference.

FIELD OF THE INVENTION

The invention relates to a lighting device for a vehicle headlight, which includes a first light module, a second light module, and a third light module, wherein the first light module, when installed in a vehicle, generates a first, specified overall light distribution in a region in front of the motor vehicle, and the second light module, when installed in a vehicle, generates a first specified partial light distribution in a region in front of the vehicle, and the third light module, when installed in a vehicle, generates a second specified partial light distribution in a region in front of the vehicle, and wherein, when the first and second light modules produce illumination, the first overall light distribution at least partially overlaps the first partial light distribution, such that a second overall light distribution is formed.

The invention also relates to a vehicle headlight having at least one such lighting device.

In addition, the invention relates to a motor vehicle having at least one, and preferably two, such vehicle headlights.

BACKGROUND

Due to legal requirements, the light distributions of vehicle headlights must comply with a number of conditions. In addition to the legal requirements, customer requirements—for instance regarding homogeneity of a light distribution—must be implemented.

For example, as a matter of law, transitions from brightly lit to dimmed out distribution regions are defined as blurred light/dark boundaries (LD boundaries), wherein the LD borders must be neither too sharp nor too washed out—that is, the maximum sharpness (the degree of hardness of the LD boundary is specified by the measured value G) of the HD boundary is prescribed by law (in ECE Member States, lower boundaries for this measured value are also specified by law). Such a blurring of the LD boundary causes the LD boundary to be perceived by the driver as "softer", and subjectively more pleasant.

The sharpness and/or blurring of this LD boundary is quantified by the maximum of a gradient along a vertical section through the LD boundary. For this purpose, the logarithm of the illuminance is calculated at measurement points in 0.1° intervals. Subtraction then gives the gradient function. The maximum of this function is referred to as the gradient of the LD boundary. Because this definition does not accurately model human perception of brightness, differently perceived LD boundaries may have the same measured gradient value and/or different gradients can be measured for similar-looking LD boundaries.

Another issue is the generation of segmented light distributions. These are used, by way of example, in the production of dynamic light distributions, for example in the case of a glare-free high beam. The technical field uses the term 'ADB systems' (Adaptive Driving Beam). In particular designs, such a dynamic light distribution is constructed from one or more individual light distributions. By way of example, individual light sources each generate a small segment in the light pattern, wherein an optical head is assigned to each of these individual light sources. The overlap of these light segments then produces the overall light distribution. Individual segments can be switched off (i.e., not illuminated) in the light pattern by switching off individual light sources. The segments in this case are typically arranged in rows and/or columns.

The use of different light modules to generate an overall light distribution as required by law can cause sharp transitions between the light distributions generated by the individual light modules, which are perceived as unpleasant. These transitions, or so-called inhomogeneities, become visible in front of the vehicle. Consequently, a light distribution is used which has very large gradients in the intensity transition, which are therefore not clearly perceived by the human eye.

One approach known in the prior art for softening the gradient is that of adjusting the curvature of the optical head (see, for example, DE 102 009 053 581 B3) to the extent permitted by the optical system (lens diameter, back focal distance of the lens). This approach is used in particular in the devices which are configured with an optical head. Such an adaptation can be achieved, for example, by the use of microstructures on the boundary surfaces of the imaging lenses, and is known from the prior art. With a change in curvature on the exit surface of an optical head, the strip-shaped light distributions, by way of example, are given variable size. As a result, a certain luminous flux fraction is distributed over a greater area. The result is a broadening of the LD region, whereby the human eye perceives the illumination transition with less contrast. However, this approach is of limited application. By way of example, the large gradient at the lower region of a segmented high beam light distribution—which will be discussed further below—cannot be manipulated in this manner.

In another approach known in the prior art, a roughening (for example, by sandblasting) which homogenizes transitions is undertaken on the optical head elements. The process of sandblasting always leads to different geometries in the tool or on the lens surface. The disadvantage of this approach is that each production batch looks different and leads to (mostly) small variations in the gradient values.

The solutions named above can therefore only be applied in special cases rather than generally (see, for example, DE 102 006 052 749 A1, DE 102 008 036 193 A1, EP 2518397 A2, DE 102 007 052 745 A1, DE 102 007 052 742 A1).

The disadvantages of the prior art described above should be remedied.

BRIEF SUMMARY

Therefore, the problem addressed by this invention is that of providing a lighting device which can be used to realize a light pattern which complies with legal stipulations and is simultaneously not perceived as unpleasant.

To reach legally specified light intensity values, first the strength of the light emitted from the lighting device must be measured. The measurement is usually done by a measuring screen being arranged and illuminated perpendicularly to the optical axis of the lighting device at a certain distance in front of the lighting device. A special orthogonal coordinate pair—the hh line and vv line—is defined on the measuring screen. The position of a point on the measuring screen is specified in degrees. The intensity values are taken in the form of a two-dimensional distribution, and represented, for example, as an isolux diagram (isolux lines). The light intensity profile curve constitutes a section through the isolux distribution along a certain curve, wherein the sectional curve is usually a straight line which runs parallel to the ordinate (vv line) on the isolux line diagram. Such light intensity profiles are used when comparing different light distributions.

The problem described above is addressed, using an aforementioned lighting device according to the invention, in that the first overall light distribution is a low beam light distribution, the first partial light distribution is a partial high beam light distribution, the second overall light distribution is a high beam light distribution, the second partial light distribution lies entirely below the hh line prescribed by law, or is bounded by the hh line at the top, and at least partially overlaps the high beam light distribution, wherein simultaneous activation of all three light modules forms a third overall light distribution.

In a preferred embodiment, the lighting device is designed in such a manner that the first specified partial light distribution has a lower boundary which is at least partially in the first specified overall light distribution, said lower boundary at least partially overlapped by the second partial light distribution when the second and third light modules are illuminated at the same time.

It has proven useful to describe the light distributions by the relevant light intensity profiles. Thus, according to the invention, the second overall light distribution is characterized by a first light intensity profile taken along a defined sectional curve.

It is expedient for the third overall light distribution to be characterized by a second light intensity curve taken along the defined sectional curve.

According to the invention, the overlap of the first overall light distribution with the first partial light distribution is thus compared with the overlap of the first overall light distribution, the first partial light distribution, and the second partial light distribution.

This comparison is made utilizing characteristic light intensity profile curves, and is quantified by radii of curvature of both curves (the use of radii of curvature as a measure of quantification is discussed later), wherein according to the invention, the first light intensity profile curve and the second light intensity profile curve are each at least twice continuously differentiable. It should be noted at this point that the light intensity profile curves are created by interpolation, such as spline interpolation. In this interpolation, certain requirements which must be met by the light intensity profile curves for the smoothness of the compensation curves (e.g., order of the spline interpolation)—in short, the smoothness characteristics—can be specified.

Preferably, the light intensity curves are taken along a straight sectional curve.

It is also particularly advantageous that the straight sectional curve runs parallel to the ordinate of the isolux diagram.

To compare the light intensity profile curves, a corresponding measure is needed. It is noted at this point once again that the objective of the present invention is to reduce the magnitude of the inhomogeneity of the light distributions. The magnitude of an inhomogeneity is reflected in the extent to which the light intensity values change within a certain range. With respect to light intensity profile curves, this means how fast the curve rises or falls within a certain interval.

As a measure for this intensity change rate, it is advantageous to choose the amount of change of the radius of curvature along a positive or negative slope region. A positive or negative slope region in which the minimum radius of curvature is large, appears "flatter" than a positive or negative slope region in which the minimum radius of curvature is small. As a result, in the first case, the light distribution in this region is perceived as more pleasant.

It is therefore advantageous that the minimum radius of curvature in at least one positive slope region of the first light intensity profile curve in which the light intensity values increase monotonically, and preferably in all positive slope regions, is less than or equal to the minimum radius of curvature in a positive slope region of the second light intensity profile curve in which the light intensity values increase monotonically, and preferably in all positive slope regions.

Moreover, the minimum radius of curvature in at least one negative slope region of the first light intensity profile curve in which the light intensity values decrease monotonically, and preferably in all negative slope regions, can be less than or equal to the minimum radius of curvature in a negative slope region of the second light intensity profile curve in which the light intensity values decrease monotonically, and preferably in all negative slope regions.

With regard to the shape of the second partial distribution, it is advantageous that the third light module is designed and/or arranged in such a manner that it illuminates a horizontally extended strip-shaped segment, wherein the ratio of the segment width to the segment height is at least 2 to 1, and preferably up to 10 to 1.

Furthermore, it can be contemplated that the third light module is designed and/or arranged in such a manner that it illuminates a horizontally extended strip-shaped segment, the same lying horizontally in a range between about −20° and about +20°.

In addition, it is advantageous that the third light module is designed and/or arranged in such a manner that it illuminates a horizontally extended strip-shaped segment, the same lying horizontally in a range between about −20° and about +10°, when installed in a vehicle, wherein the vehicle is designed for right-hand traffic.

Moreover, the third light module can be designed and/or arranged in such a manner that it illuminates a horizontally extended strip-shaped segment, the same lying horizontally in a range between about −10° and about +20°, when installed in a vehicle, wherein the vehicle is designed for left-hand traffic.

It can be contemplated that the third light module is designed and/or arranged in such a manner that illuminates a horizontally extended strip-shaped segment on a measurement screen arranged at a certain distance in front of the lighting device, wherein the horizontal extent of said segment is in a range from 20° to 40°, but preferably 30°.

In summary, the third light module illuminates a horizontally extended strip-shaped segment in a horizontal angle range which is generally between -20° and about +20°, with a horizontal extension between 20° and 40°, but preferably 30°, but can nevertheless be adapted to the road transport system, such that the horizontal angle range for right-hand traffic vehicles is between about −20° and about +10°, and for left-hand traffic vehicles is between about −10° and about +20°.

It is also advantageous that the third light module is designed and/or arranged in such a manner that it illuminates a horizontally extended strip-shaped segment, wherein the same lies vertically in a range between about 4.5° and about 0°.

Likewise, the third light module can be designed and/or arranged in such a manner that it illuminates a horizontally extended strip-shaped segment with a vertical extension in a range between 0° and 4.5°, preferably between 3° and 4.5°.

As such, the third light module illuminates a horizontally extended strip-shaped segment which lies in a vertical angle range of about 0° to about 4.5°, with the vertical extent in a range between 0° and 4.5°, preferably between 3° and 4.5°. In this case, the segment is subjected to the condition that it either lies completely below the hh line, or is bounded by this line at the top.

Various configurations and embodiments of the third light module are suitable for targeted lighting of the regions named above.

It has proven advantageous for the third light module to comprise at least one light source and at least one optical head and/or at least one reflector assigned to the at least one light source.

It is possible in principle in a concrete embodiment for the reflector assigned to the third light module to be designed as a freeform reflector—for example, as a free-form reflector with a parabolic basic shape.

Furthermore, it is advantageous for the light source arranged in the third light module to be designed as a lamp, for example an incandescent lamp according to the ECE-R37 standard, or a standard gas discharge lamp according to the ECE-R99 standard.

In one of the preferred embodiments, the light source arranged in the third light module is formed from one, two or more LEDs. In one of the preferred embodiments, the light source arranged in the third light module is constructed as a laser light source.

Furthermore, it is advantageous that the light source arranged in the third light module emits light in a prespecified or prespecifiable spectral range.

It is expedient in this case that the light source arranged in the third light module emits light with a color which can be matched to the color of the light emitted from the first light module and/or the second light module.

In a specific embodiment of the invention, the first light module, the second light module, and the third light module are arranged in a vehicle headlight housing.

In another specific embodiment of the invention, the first light module and the second light module are arranged in a vehicle headlight housing, and the third light module is designed as an auxiliary light module and arranged outside of the vehicle headlight housing.

Moreover, it can be contemplated that the first overall light distribution is a low beam distribution.

Furthermore, it is advantageous that the first partial light distribution is a partial high beam light distribution.

Moreover, the first partial light distribution can be a partial high beam light distribution which is formed of one or more, preferably rectangular, segments, and has a preferably-linear lower boundary.

BRIEF DESCRIPTION OF THE DRAWINGS

The present invention is described below in more detail using preferred non-restrictive embodiments, with reference to the drawings, wherein.

DETAILED DESCRIPTION

Figure 1:
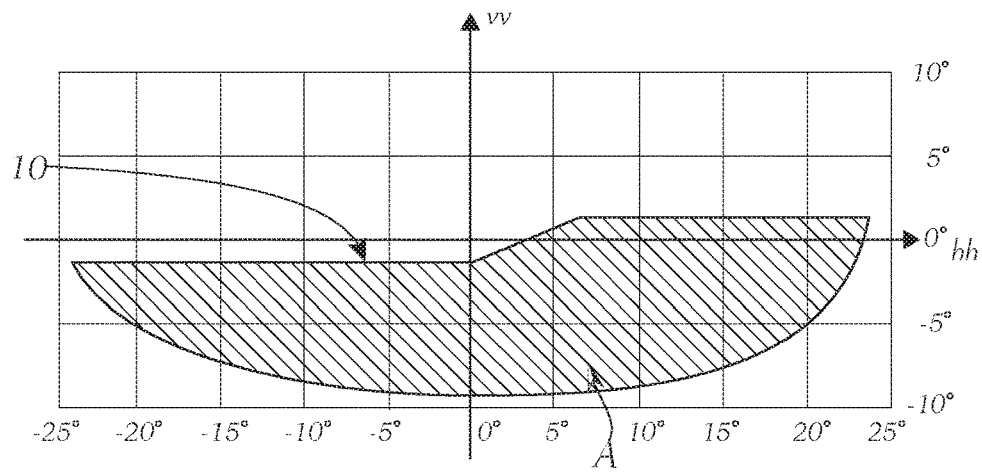
FIG. 1 shows a first overall light distribution.
Figure 2:
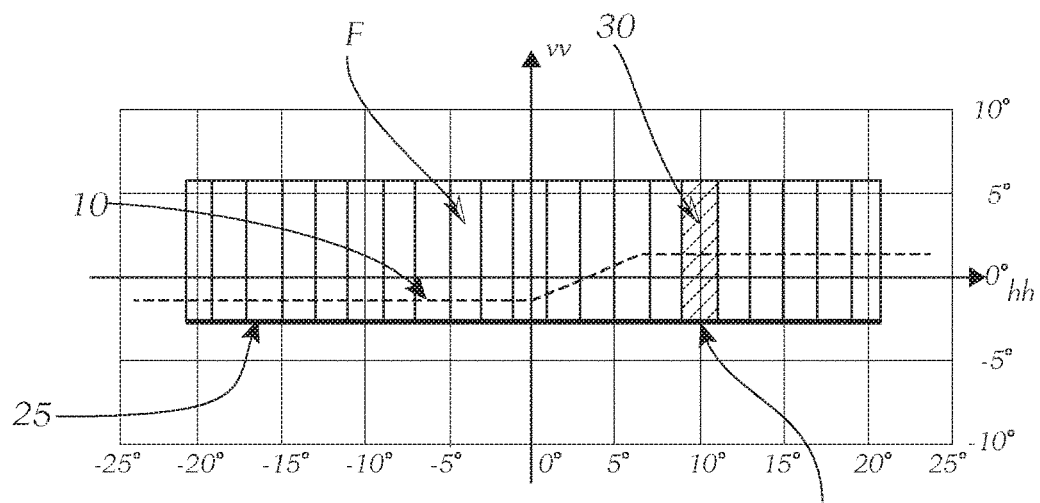
FIG. 2 shows a first partial light distribution.
Figure 3:
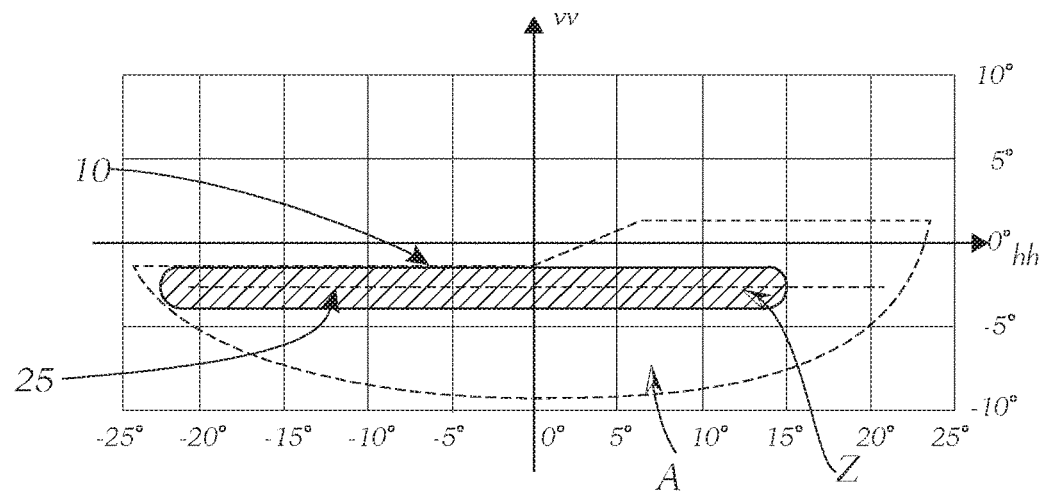
FIG. 3 shows a second partial light distribution.
Figure 12:
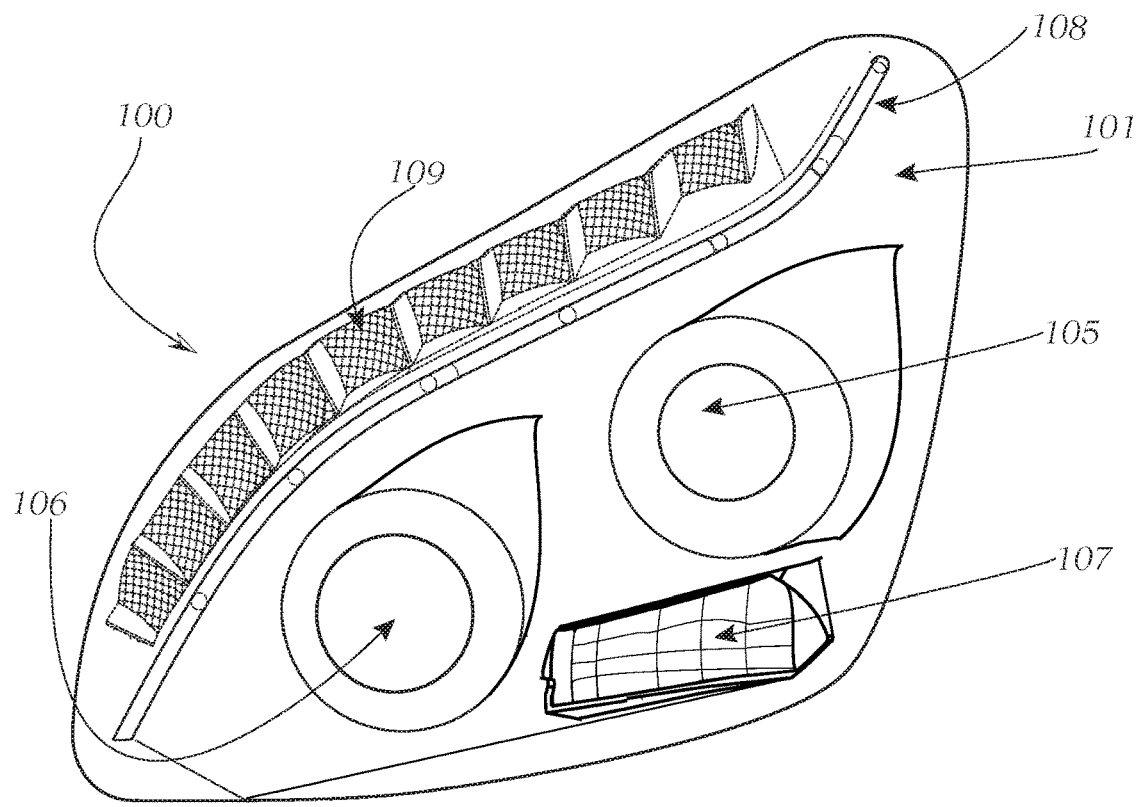
FIG. 12 shows a vehicle headlight having light modules arranged within a housing.
Figure 13:
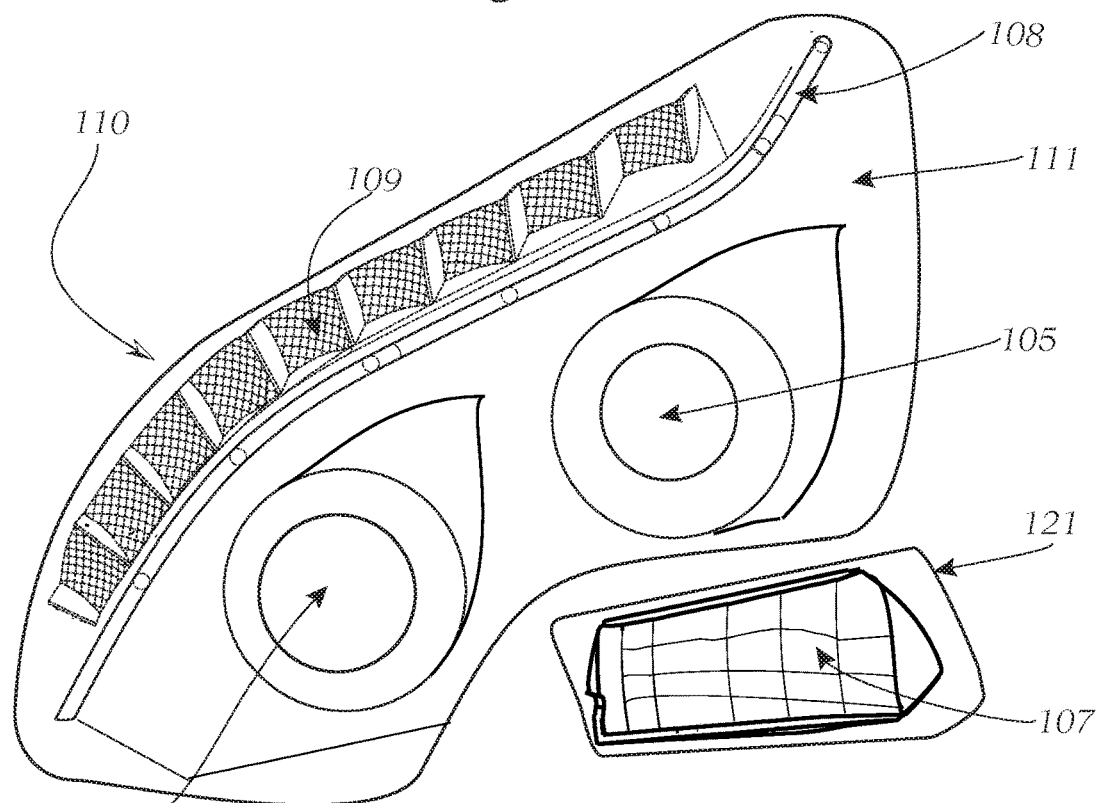
FIG. 13 shows a vehicle headlight having the third light module arranged outside a housing.

The following first addresses FIGS. 1-3, which show three basic schematic light distributions. FIG. 1 schematically shows a first typical overall light distribution, in this case in the form of a low beam distribution A which is generated, for example, by means of a light module 105 according to the prior art, as shown in FIGS. 12 and 13. The low beam distribution has a light/dark boundary 10, which has a typical asymmetry in the case shown, for the use of the low beam in right-hand traffic countries.

FIG. 2 schematically shows a segmented partial light distribution—the partial high beam light distribution F which is formed of rectangular, vertically extended segments 30 and has a lower boundary 25 at which the light intensity of this partial beam distribution has a strong gradient. Such a partial light distribution can be produced, for example, with a known light module 106 according to the prior art, as shown in FIGS. 12 and 13.

FIG. 3 schematically shows a partial light distribution Z, which is located completely below the hh line and overlaps the low beam distribution A. The partial light distribution Z partially overlaps the lower edge 25 of the partial high beam light distribution F, as shown in FIG. 6.

Figure 4:
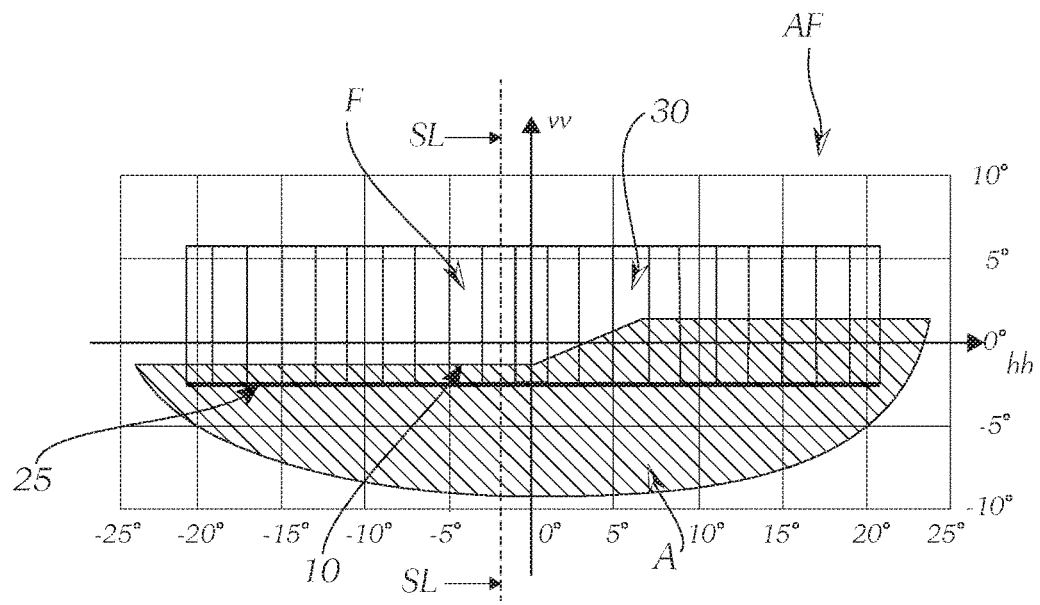
FIG. 4 shows a second overall light distribution.

FIG. 4 schematically shows a second typical overall light distribution AF, the same being a high beam light distribution, which is produced by the simultaneous illumination of the light modules 105, 106 shown in FIGS. 12 and 13, resulting from the overlap of the low beam distribution A and the partial high beam light distribution F. FIG. 4 also shows a sectional line SL which runs parallel to the ordinate (vv line) vv and intersects the abscissa (hh line) hh at about −2.5°.

Figure 5:
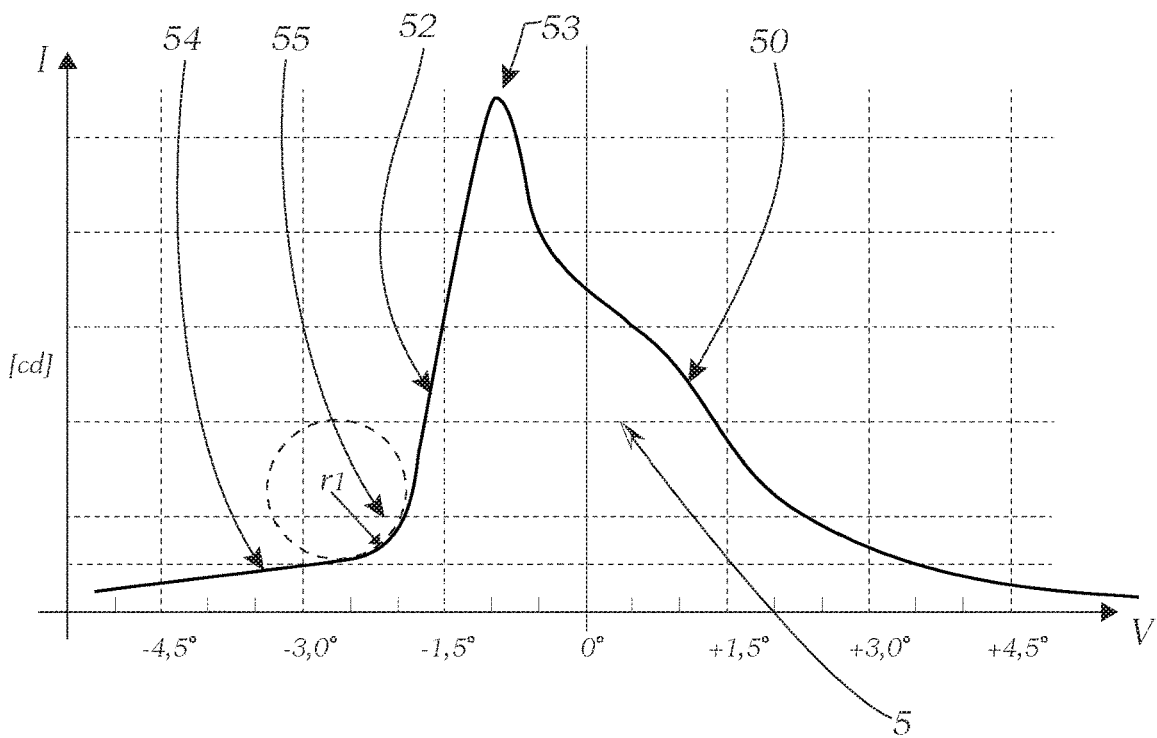
FIG. 5 shows a first light intensity profile curve taken along a defined sectional curve.

FIG. 5 shows a light intensity profile curve 5 which characterizes the second unmodified overall light distribution AF, and which was taken along the sectional curve SL. The light intensity profile curve 5 shows the light intensity values in Candela [cd] when the low beam module 105 and high beam module 106 are illuminated at the same time, as a function of a parameter which is determined by the selection of the sectional curve SL. Because the sectional curve SL in FIG. 4 runs parallel to the vv line, the parameter in FIG. 5 is equal to the angle indicated in degrees on the vv line. The light intensity profile curve 5 in this example of the overall light distribution AF has a rising region which consists of a flat part 54, a steep part 52, and a transition region 55, and also a maximum 53 and a falling region 50. The first flat slope region 54 is characterized by a weak gradient, wherein the second steep rising region 52 has a strong gradient. The shape of the transition region 55 reflects how strongly the gradient function (not shown) changes in this area. The radius of curvature r1 along the transition region 55 serves as a measure of this change.

Figure 6:
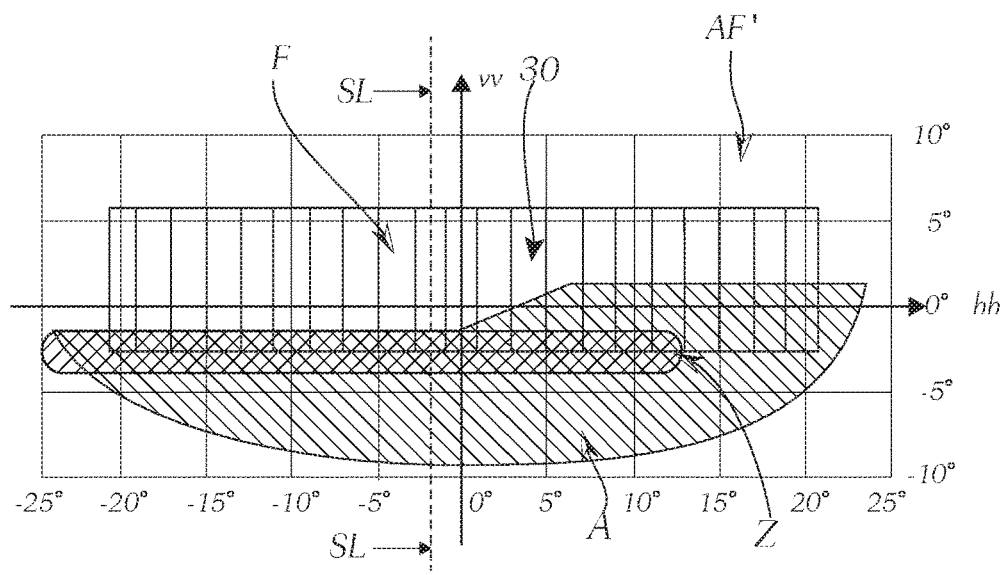
FIG. 6 shows a third overall light distribution according to the invention.

FIG. 6 schematically shows a third overall light distribution AF' according to the invention, produced by simultaneous illumination of the light modules 105, 106 and 107 shown in FIGS. 12 and 13, resulting from the overlap of the low beam distribution A, the segmented partial high beam light distribution F, and the second partial light distribution Z according to the invention. In addition, FIG. 6 shows a sectional line SL which runs parallel to the vv line and intersects the abscissa (hh line) at, for example, about H =−2.5°. The arrangement of the second partial light distribution Z according to the invention in FIG. 6 differs from its arrangement in FIG. 3. First, it is quite conceivable that the partial light distribution Z according to the invention is not included in the low beam distribution, and rather partially overlaps the same. On the other hand, the partial light distribution Z, in a preferred embodiment of the invention, can be bounded at the top by the hh line.

Figure 7:
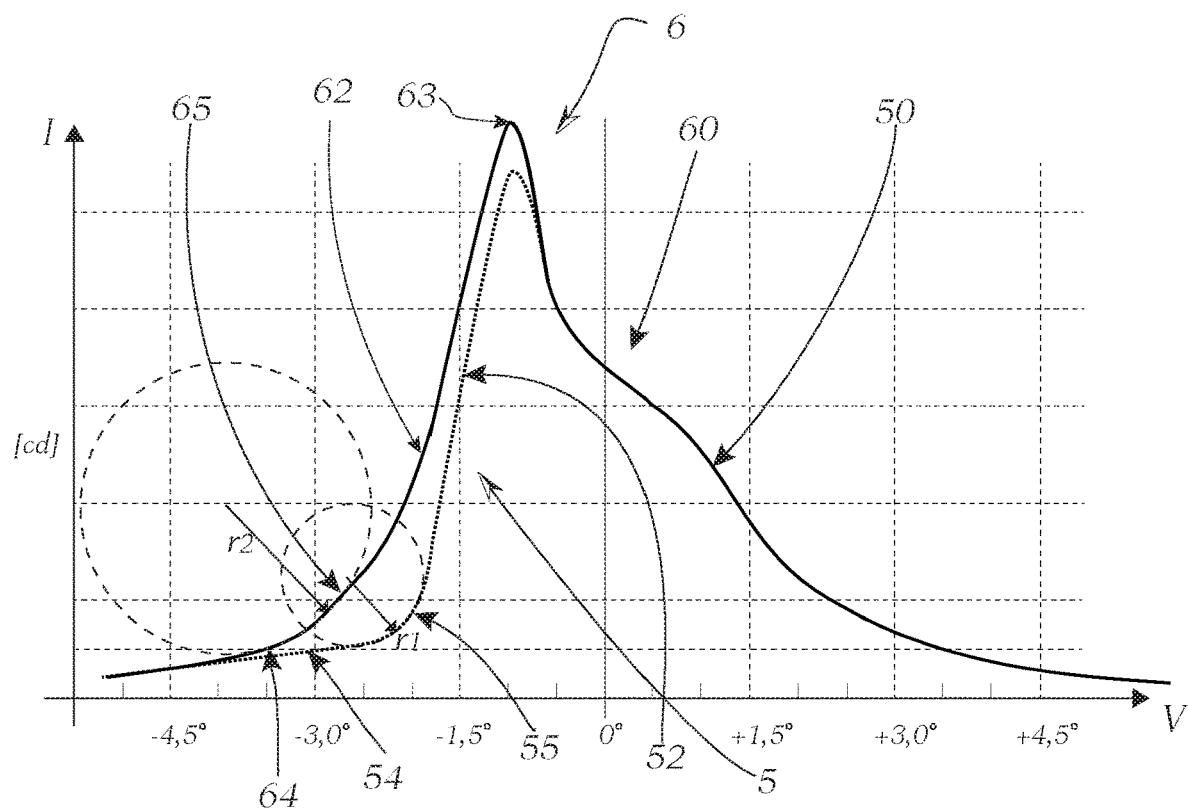
FIG. 7 shows a second light intensity profile curve taken along a defined sectional curve.

FIG. 7 shows two light intensity profile curves 5, 6 plotted at the same time. The first light intensity profile curve 5 has already been discussed in the description of FIG. 5, and is plotted here with a dashed line to illustrate the differences between the unmodified (second) overall light distribution AF and the modified (third) overall light distribution AF'. The second light intensity profile curve 6 (solid line) characterizes the third modified overall light distribution AF', and was taken along the sectional curve SL. The second light intensity profile curve 6 shows the dependence of the light intensity values in Candela [cd] when the low beam module 105, high beam module 106, and the additional module 107 according to the invention are illuminated at the same time, as a function of a parameter which is determined by the selection of the sectional curve SL. Because the sectional curve SL in FIG. 6 runs parallel to the vv line, the parameter in FIG. 7 is equal to the angle in degrees plotted on the vv line. The second light intensity profile curve 6 has, in this example of the overall light distribution AF', a rising region which consists of a flat part 64, a steep part 62, and a transition region 65, and also a maximum 63 and a falling region 60, wherein the falling region 60 of the second light intensity profile curve 6 almost completely matches the falling region 50 of the first light intensity profile curve 5. Here, too, the radius of curvature r2 along the transition zone 65 is a measure of the change in the gradient of the third overall light distribution AF'. Because the transition region 65 of the second light intensity profile curve 6 is less curved than the transition region 55 of the first light intensity profile curve 5, the minimum value of the radius of curvature r2 along the transition region 65 is greater than the minimum value of the radius of curvature r1 along the transition region 55. This shows that the transition 65 is "softer" than the transition 55, and is subjectively more pleasant for the driver.

Figure 8:
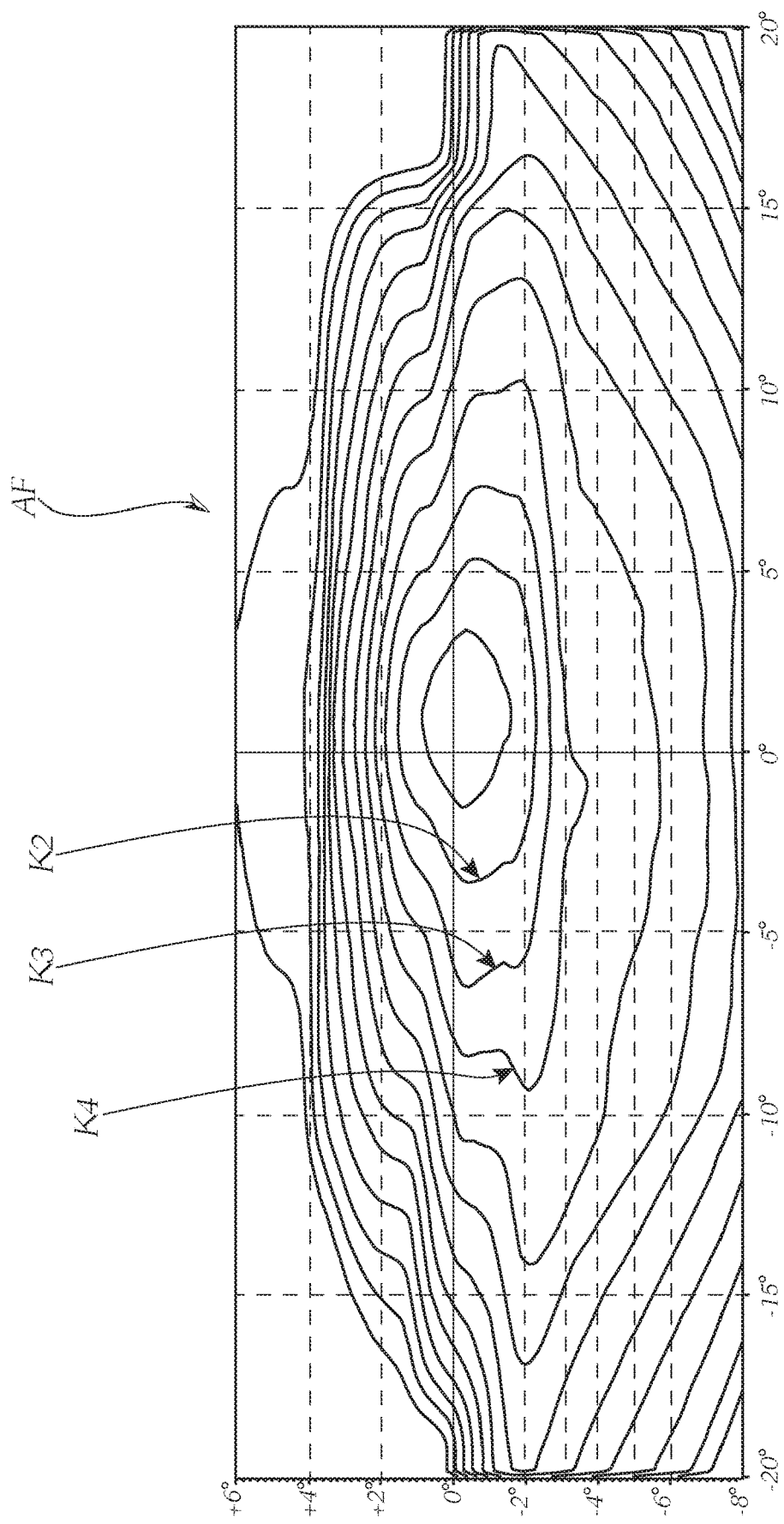
FIG. 8 shows an isolux diagram of the second overall light distribution.
Figure 9:
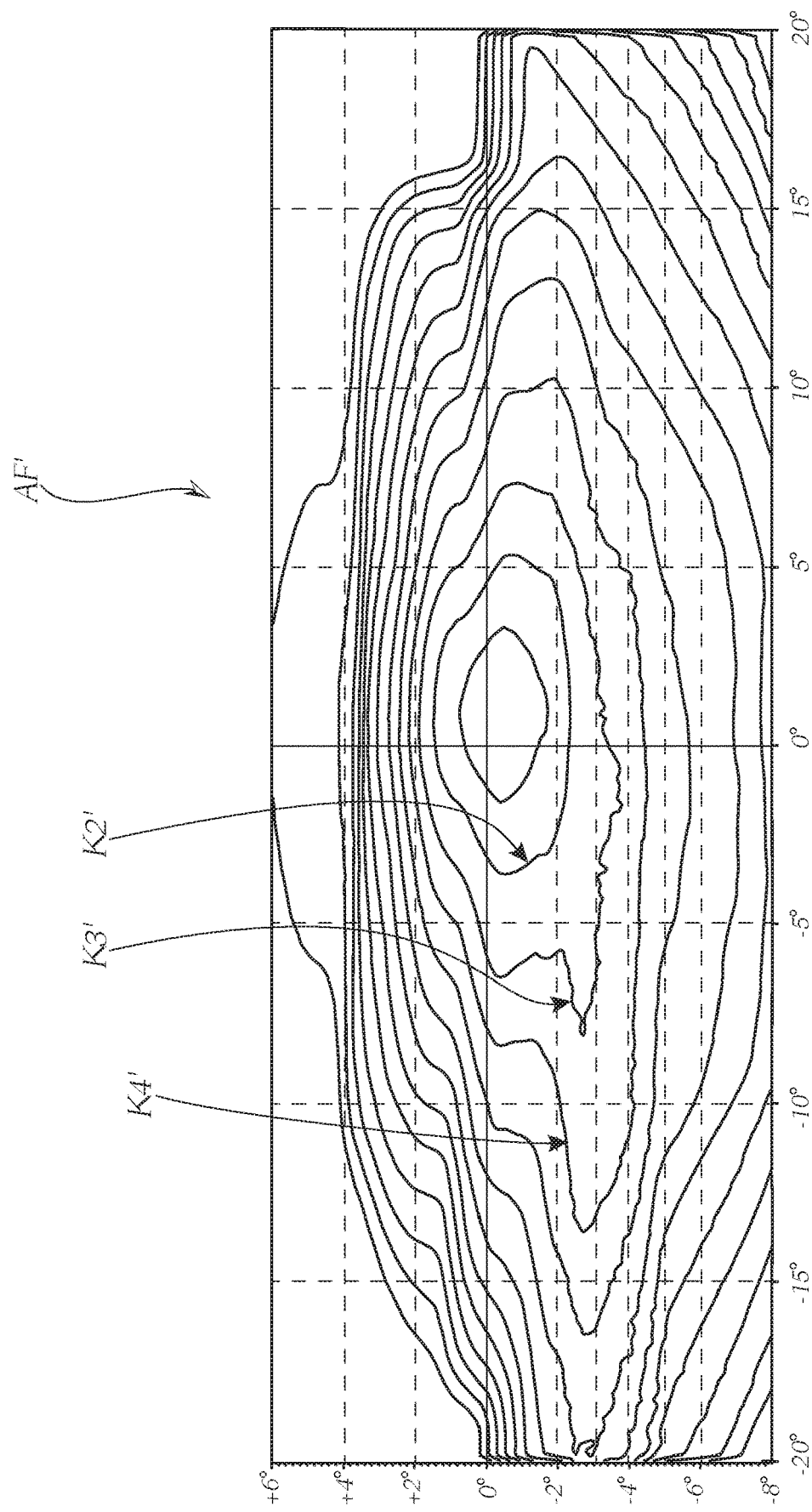
FIG. 9 shows an isolux diagram of the third overall light distribution.

FIGS. 8 and 9 show the differences discussed above between the typical unmodified second overall light distribution AF and the third overall light distribution AF' modified according to the invention. Both figures illustrate an isolux diagram which corresponds to a corresponding light distribution taken on a measuring screen set up at a certain distance perpendicular to the optical axis of the light modules. Each contour—called isolux lines—describes a set of points at which the light intensity is of a certain light intensity value which is the same for all points of this set. The spacing between the contours, measured along a certain section, describes how much the gradient along this section changes. The distance measured in FIG. 8 along the vertical line H=0° (the vv line) between the second K2 and the third K3, as well as between the third K3 and the fourth K4, contours is clearly smaller than the distance measured in FIG. 9 along the vertical line H=0° (the vv line) between the second k2' and the third K3', as well as between the third K3' and the fourth K4' contours, and reflects the reduction of the gradient. For this reason, the overall light distribution AF' generated by the third light module according to the invention is perceived as more pleasant by the driver than the typical overall light distribution AF.

Figure 10:
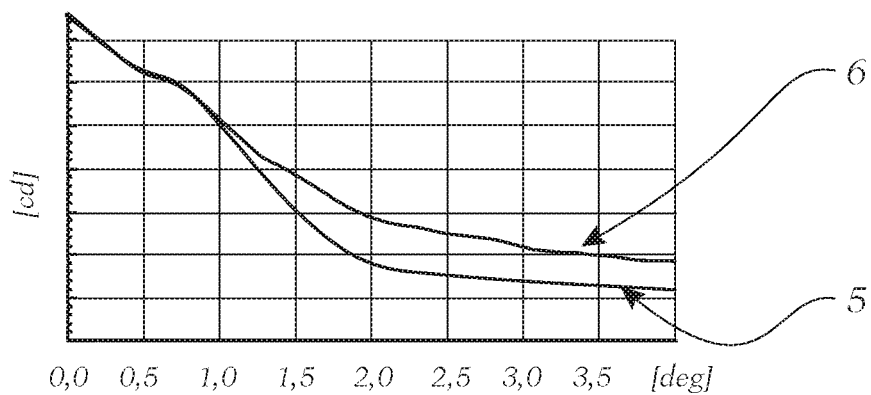
FIG. 10 shows a comparison of two light intensity profile curves taken at H=0°, with the third light module according to the invention illuminated and without the third light module according to the invention illuminated.
Figure 11A:
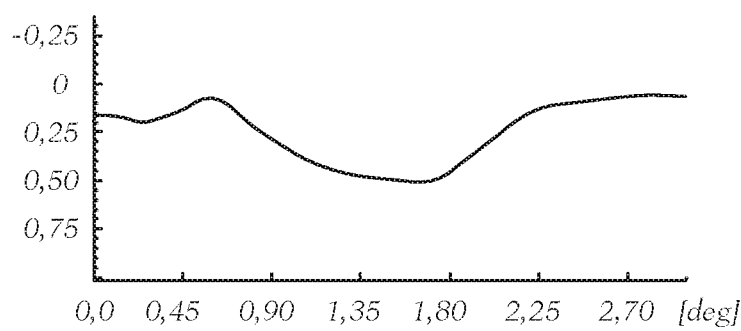
FIG. 11a shows a gradient profile with the third light module according to the invention illuminated.
Figure 11B:
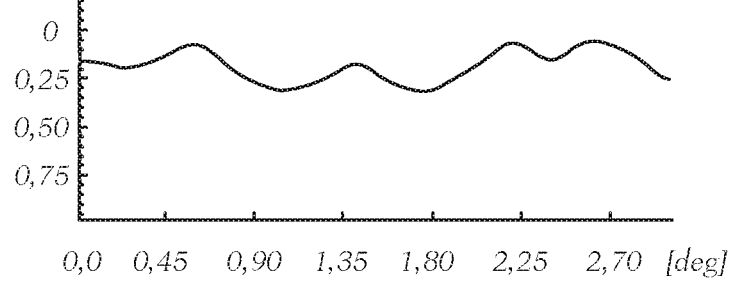
FIG. 11b shows a gradient profile without the third light module according to the invention illuminated.

The corresponding light intensity profile curves 5, 6 and the associated gradient functions are shown in FIG. 10 and FIGS. 11*a* and 11*b*. The minimum value of the gradient in FIG. 11*a* is about 0.5 and is greater than the minimum value of the gradient in FIG. 11*b*, which is about 0.25.

Various arrangements and configurations of the third light module 107 can be contemplated for generating the second partial light distribution according to the invention. A reflector is preferably assigned to the third light module 107, as shown in FIG. 12 and FIG. 13. It is advantageous to arrange the third light module 107 with the first light module 105 and with the second light module 106 in a vehicle headlight housing 101, as shown in FIG. 12. However, this overall arrangement could, depending on the dimensions of the individual light modules, violate the ECE regulations. Therefore, it can be contemplated that the third light module 107 is arranged outside of the vehicle headlight housing. This arrangement is shown in FIG. 13.

The invention has been described with the example of a segmented partial high beam light distribution, for which the invention is particularly advantageous because a segmented partial light distribution has a lower edge 25 where the overall high beam light distribution has a particularly strong gradient.

However, in principle, the invention is also applicable in the context of non-segmented partial high beam light distributions.

We claim:

1. A lighting device for a vehicle headlight, the lighting device comprising:
   a first light module (105);
   a second light module (106); and
   a third light module (107),
   wherein:
   the first light module (105) is configured to generate a first overall light distribution (A) when installed in a vehicle in a region in front of the vehicle,
   the second light module (106) is configured to generate a first partial light distribution (F) when installed in the vehicle in the region in front of the vehicle, and
   the third light module (107) is configured to generate a second partial light distribution (Z) when installed in the vehicle in the region in front of the vehicle, and
   when the first and second light modules (105,106) are illuminated at the same time, the first overall light distribution (A) at least partially overlaps the first partial light distribution (F) such that a second overall light distribution (AF) is formed, the first overall light distribution is a low beam light distribution (A), the first partial light distribution is a partial high beam light distribution (F), the second overall light distribution is a high beam light distribution (AF), and the second partial light distribution (Z) lies entirely below an hh line (hh) or is bounded by at least one horizontal section of a light/dark boundary (10) of the low beam light distribution (A) at a top thereof and at least partially overlaps the high beam light distribution (AF), and the partial high beam light distribution (F) has a lower boundary (25), which lies at least partially in the low beam light distribution (A), and when the second and third light modules are illuminated at the same time, the partial high beam light distribution (F) is at least partially overlapped by the second partial light distribution (Z), wherein when the first, second, and third light modules (105,106,107) are illuminated at the same time, a third overall light distribution (AF') is formed.

2. The lighting device according to claim 1, wherein the second overall light distribution (AF) comprises a first light intensity profile curve (5) taken along a defined sectional curve (SL).

3. The lighting device according to claim 2, wherein the third overall light distribution (AF') comprises a second light intensity profile curve (6) taken along the defined sectional curve (SL).

4. The lighting device according to claim 3, wherein the first light intensity profile curve (5) and the second light intensity profile curve (6) are each at least twice continuously differentiable.

5. The lighting device according claim 2, wherein the defined sectional curve (SL) is a straight line.

6. The lighting device according to claim 5, wherein the defined sectional curve (SL) runs parallel to a vv line (vv).

7. The lighting device according to claim 3, wherein a minimum radius of curvature (r1) in at least one positive slope region (52, 54) of the first light intensity profile curve (5) in which light intensity values increase monotonically is less than or equal to a minimum radius of curvature (r2) in a positive slope region (62, 64) of the second light intensity profile curve (6) in which light intensity values increase monotonically.

8. The lighting device according to claim 3, wherein a minimum radius of curvature in at least one negative slope region (50) of the first light intensity profile curve (5) in which light intensity values decrease monotonically is less than or equal to a minimum radius of curvature in a negative slope region (60) of the second light intensity profile curve (6) in which light intensity values decrease monotonically.

9. The lighting device according to claim 1, wherein the third light module (107) is configured to illuminate a horizontally extended strip-shaped segment (Z), wherein a ratio of a segment width to a segment height is at least 2 to 1.

10. The lighting device according to claim 1, wherein the third light module (107) is configured to illuminate a horizontally extended strip-shaped segment (Z) lying horizontally in a region between about −20° and about +20°.

11. The lighting device according to claim 1, wherein the third light module (107) is configured to illuminate a horizontally extended strip-shaped segment (Z) lying horizontally in a region between about −20° and about +10°, when installed in the vehicle, which is designed for right-hand traffic.

12. The lighting device according to claim 1, wherein the third light module (107) is configured to illuminate a horizontally extended strip-shaped segment (Z) lying horizontally in a region between about −10° and about +20° when installed in the vehicle, which is designed for left-hand traffic.

13. The lighting device according to claim 1, wherein the third light module (107) is configured to illuminate a horizontally extended strip-shaped segment, a horizontal extension of which lies in a region from 20° to 40°.

14. The lighting device according to claim 1, wherein the third light module (107) is configured to illuminate a horizontally extended strip-shaped segment that lies vertically in a region between about 4.5° and about 0°.

15. The lighting device according to claim 1, wherein the third light module (107) is configured to illuminate a horizontally extended strip-shaped segment with a vertical extension in a region between 0° and 4.5°.

16. The lighting device according to claim 1, wherein the third light module (107) comprises at least one light source and at least one optical head and/or at least one reflector assigned to the at least one light source.

17. The lighting device according to claim 16, wherein the at least one reflector assigned to the third light module (107) comprises a freeform reflector with a parabolic basic shape.

18. The lighting device according to claim 16, wherein the at least one light source arranged in the third light module (107) comprises an incandescent lamp according to the ECE-R37 standard or a standard gas discharge lamp according to the ECE-R99 standard.

19. The lighting device according to claim 16, wherein the at least one light source arranged in the third light module (107) comprises one, two, or more LEDs.

20. The lighting device according to claim 16, wherein the at least one light source arranged in the third light module comprises a laser light source.

21. The lighting device according to claim 16, wherein the at least one light source arranged in the third light module (107) is configured to emit light in a prespecified or prespecifiable spectral range.

22. The lighting device according to claim 16, wherein the at least one light source arranged in the third light module (107) is configured to emit light with a color which can be matched to a color of the light emitted from the first light module (105) and/or the second light module (106).

23. The lighting device according to claim 1, wherein the first light module (105), the second light module (106), and the third light module (107) are arranged in a vehicle headlight housing (101).

24. The lighting device according to claim 1, wherein the first light module (105) and the second light module (106) are arranged in a vehicle headlight housing (101), and the third light module (107) is configured as an additional light module (121) that is arranged outside the vehicle headlight housing (101).

25. A vehicle headlight having at least one lighting device according to claim 1.

26. A motor vehicle having at least one vehicle headlight according to claim 25.

27. The lighting device according to claim 7, wherein the light intensity values of the first light intensity profile curve and/or of the second light intensity profile curve increase monotonically in all positive slope regions.

28. The lighting device according to claim 8, wherein the light intensity values of the first light intensity profile curve and/or of the second light intensity profile curve decrease monotonically in all negative slope regions.

29. The lighting device according to claim 9, wherein the ratio of the segment width to the segment height is between 2 to 1 and 10 to 1.

30. The lighting device according to claim 15, wherein the third light module (107) is configured to illuminate a horizontally extended strip-shaped segment with a vertical extension in a region between 3° and 4.5°.

* * * * *